(12) United States Patent  
Kim

(10) Patent No.: US 8,300,151 B2
(45) Date of Patent: Oct. 30, 2012

(54) DISPLAY APPARATUS AND CONTROL METHOD THEREOF

(75) Inventor: Hee-sung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 12/558,081

(22) Filed: Sep. 11, 2009

(65) Prior Publication Data

US 2010/0123823 A1   May 20, 2010

(30) Foreign Application Priority Data

Nov. 18, 2008   (KR) .................. 10-2008-0114822

(51) Int. Cl.
*H04N 5/45* (2011.01)
*H04N 5/50* (2006.01)
*H04N 3/24* (2006.01)

(52) U.S. Cl. .................. 348/634; 348/565; 348/569
(58) Field of Classification Search .................. 348/565, 348/569–570, 634
See application file for complete search history.

(56) References Cited

U.S. PATENT DOCUMENTS

| | | | | |
|---|---|---|---|---|
| 5,194,951 A * | 3/1993 | Hailey et al. | ................. | 348/581 |
| 5,386,247 A * | 1/1995 | Shafer et al. | ................. | 348/687 |
| 5,452,023 A * | 9/1995 | Kim | ................. | 348/731 |
| 5,786,845 A * | 7/1998 | Tsuria | ................. | 725/32 |
| 6,317,168 B1 * | 11/2001 | Seo | ................. | 348/725 |
| 6,529,246 B1 * | 3/2003 | Maeda | ................. | 348/570 |
| 6,587,155 B1 * | 7/2003 | Xue | ................. | 348/595 |
| 6,678,009 B2 * | 1/2004 | Kahn | ................. | 348/569 |
| 7,034,851 B1 * | 4/2006 | Furui et al. | ................. | 345/660 |
| 7,227,583 B2 * | 6/2007 | Sin | ................. | 348/570 |
| 7,319,493 B2 * | 1/2008 | Hata et al. | ................. | 348/584 |
| 7,589,789 B2 * | 9/2009 | Choi | ................. | 348/441 |
| 7,884,883 B2 * | 2/2011 | Kondo et al. | ................. | 348/563 |
| 2007/0206119 A1 * | 9/2007 | Matsui et al. | ................. | 348/557 |
| 2007/0236493 A1 * | 10/2007 | Horiuchi et al. | ................. | 345/419 |
| 2009/0064225 A1 * | 3/2009 | Lee | ................. | 725/39 |
| 2010/0199308 A1 * | 8/2010 | Hall et al. | ................. | 725/40 |

FOREIGN PATENT DOCUMENTS

| KR | 1020050056475 A | 6/2005 |
|---|---|---|
| KR | 1020070028991 A | 3/2007 |
| KR | 1020080013072 A | 2/2008 |

* cited by examiner

*Primary Examiner* — Brian Yenke
(74) *Attorney, Agent, or Firm* — Sughrue Mion, PLLC

(57) ABSTRACT

Disclosed are a display apparatus and a control method thereof preventing boring and a trouble misunderstanding due to a mute screen supplied in changing an image signal, the display apparatus, including: a display unit which displays an image; an image processing unit which processes an input image signal to be displayed in the display unit, and displays a mute image in the display unit during a mute time when changing the input image signal; and a control unit which controls the image processing unit to gradually convert the total screen of the display unit displaying the input image signal to the mute image before displaying the mute image if a change signal for changing the input image signal is input.

14 Claims, 8 Drawing Sheets

DISPLAY APPARATUS AND CONTROL METHOD THEREOF

CROSS-REFERENCE TO RELATED APPLICATION

This application claims priority from Korean Patent Application No. 10-2008-0114822, filed on Nov. 18, 2008 in the Korean Intellectual Property Office, the disclosure of which is incorporated herein by reference.

BACKGROUND OF THE INVENTION

1. Field of the Invention

An apparatus and a method consistent with the present invention relate to a display apparatus and a control method thereof, and more particularly, to a display apparatus and a control method thereof preventing boring, etc. of a mute screen applied to an image signal change according to a channel change, etc.

2. Description of the Related Art

A display apparatus processes an image signal supplied from an image signal supplying source to display in a display unit, and includes a television receiving apparatus, etc. receiving and displaying an image signal supplied from a broadcasting station.

In general, if a broadcasting channel is changed, the display employs a mute screen, that is, determining a screen to be a black level during a predetermined time interval in which an image is converted to avoid a flicking phenomenon of the screen. The predetermined time interval maintaining the mute screen is approximately 1 second in case of an analogue signal.

However, recently, as an image signal is changed from analogue to digital, the mute screen time increases approximately 1.5 to 2 second in case of a digital signal.

Accordingly, a user may feel bored or have a doubt about an apparatus trouble during the mute screen supplied in changing an image signal by a channel change of the display apparatus.

SUMMARY OF THE INVENTION

Accordingly, it is an aspect of the present invention to provide a display apparatus and a control method thereof preventing boring and a trouble misunderstanding due to a mute screen supplied in changing an image signal.

The foregoing and/or other aspects of the present invention can be achieved by providing a display apparatus, including: a display unit which displays an image; an image processing unit which processes an input image signal to be displayed in the display unit, and displays a mute image in the display unit during a mute time when changing the input image signal; and a control unit which controls the image processing unit to gradually convert the total screen of the display unit displaying the input image signal to the mute image before displaying the mute image if a change signal for changing the input image signal is input. The control unit may control the image processing unit to gradually convert the mute image displayed in the total screen of the display unit to a recovery image displaying a changed image signal after displaying the mute image in the display unit during the mute time.

At least one of a mute generating time in which the total screen of the display unit displaying the input image signal is gradually converted to the mute image, and a mute disappearing time in which the mute image of the display unit is gradually converted to the recovery image displaying the changed image signal may be approximately 0.5 second to 1 second.

The display apparatus may further include a user input unit for determining at least one of a mute generating type gradually converting the total screen of the display unit displaying the input image signal to the mute image, and a mute disappearing type gradually converting the mute image of the display unit to the recovery image displaying the changed image signal, wherein the control unit may control that at least one of the mute generating type and the mute disappearing type can be determined as a conversion type determined by the user input unit.

The display apparatus may further include an on screen display (OSD) generating unit which generates a conversion type determining menu in the display unit so that the conversion type can be determined by the user input unit.

The conversion type determinable by the user input unit may include at least one of a type of moving to convert from one side of a screen of the display unit to the other side of the screen, types of moving to convert from the opposite sides of the screen of the display unit to a central part of the screen and moving in the opposite direction thereto, and types of moving to convert from four sides of the screen of the display unit to a central part of the screen and moving in the opposite direction thereto.

The image processing unit may include a scaler which scales the input image signal, and the control unit may control the scaler to gradually convert the total screen of the display unit displaying the input image signal to the mute image before displaying the mute image if a change signal for changing the input image signal is input.

The image processing unit may include an interlace to progressive conversion (IPC) unit which adjusts an image size of an input image signal, and the control unit may control the IPC unit to gradually convert the total screen of the display unit displaying the input image signal to the mute image before displaying the mute image if a change signal for changing the input image signal is input.

The display apparatus may further include: a tuner which tunes an input broadcasting signal to output a transmission stream packet, a dimultiplexer which dimultiplexes the transmission stream packet input from the tuner to output a basic stream packet, and a decoder which decodes the basic stream packet input from the dimultiplexer to output to the image processing unit.

The display apparatus may further include an external signal input unit which receives an image signal from an outside to output to the image processing unit.

Another aspect of the present invention may be achieved by providing a display apparatus, in eluding: a display unit which displays an image; an image processing unit which processes an input image signal to be displayed in the display unit, and displays a mute image in the display unit during a mute time when changing the input image signal; and a control unit which controls the image processing unit to gradually convert the mute image displayed in the total screen of the display unit to a recovery image displaying a changed image signal after displaying the mute image in the display unit if a change signal for changing the input image signal is input.

A mute disappearing time in which the mute image of the display unit is gradually converted to the recovery image displaying the changed image signal may be approximately 0.5 second to 1 second.

The display apparatus may further include: a user input unit for determining a mute disappearing type gradually converting the mute image of the display unit to the recovery image displaying the changed image signal, and an on screen display (OSD) generating unit which generates a conversion type determining menu in the display unit so that the mute disappearing type can be determined by the user input unit.

Still another aspect of the present invention may be achieved by providing a control method of a display apparatus which comprises a display unit displaying an image, the control method of the display apparatus including: inputting a change signal for changing an input image signal; gradually converting the total screen of the display unit displaying the input image signal to a mute image; displaying the mute image in the display unit during a mute time if the total screen of the display unit is converted to the mute image; and displaying a changed image signal in the display unit after the mute image is displayed during the mute time.

The displaying the changed image signal in the display unit may include gradually converting the mute image of the display unit to a recovery image displaying the changed image signal.

The control method of the display apparatus may further include determining by a user at least one conversion type of a mute image generating type in which the total screen of the display unit displaying the input image signal is gradually converted to the mute image, and a mute image disappearing type in which the mute image of the display unit is gradually converted to the recovery image displaying the changed image signal.

The control method of the display apparatus may further include generating a conversion type determining menu in the display unit so that the conversion type can be determined by an input of a user.

The conversion type determinable by an input of a user may include at least one of a type of moving to convert from one side of a screen of the display unit to the other side of the screen, types of moving to convert from the opposite sides of the screen of the display unit to a central part of the screen and moving in the opposite direction thereto, and types of moving to convert from four sides of the screen of the display unit to a central part of the screen and moving in the opposite direction thereto.

The control method of the display apparatus may further include: tuning an input broadcasting signal to output a transmission stream packet, dimultiplexing the output transmission stream packet to output a basic stream packet, and decoding the output basic stream packet.

BRIEF DESCRIPTION OF THE DRAWINGS

The present invention will become apparent and more readily appreciated from the following description of the exemplary embodiments, taken in conjunction with the accompanying drawings, in which.

DETAILED DESCRIPTION OF EXEMPLARY EMBODIMENTS

Figure 1:
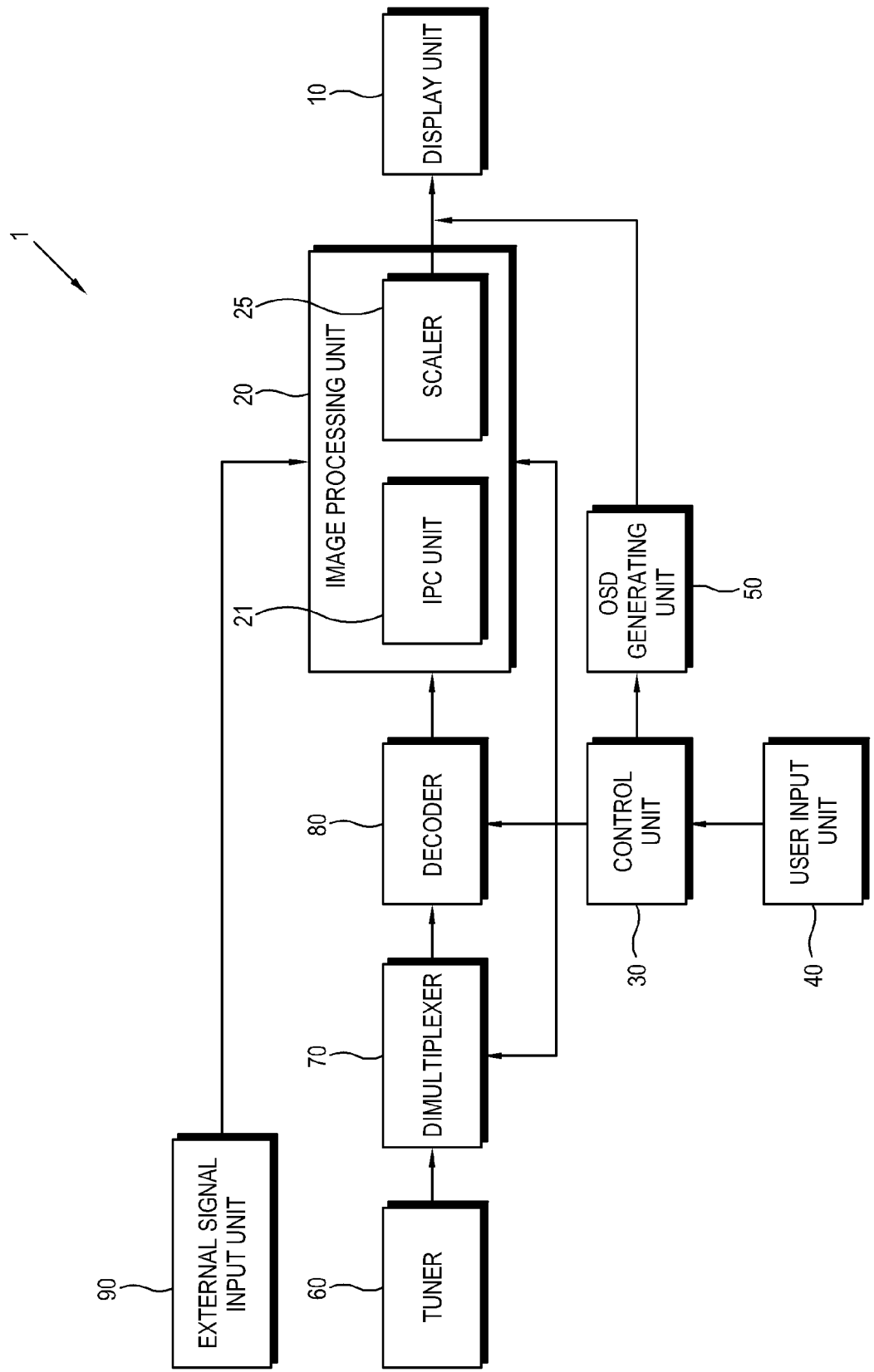
FIG. 1 is a control block diagram of a display apparatus according to an exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures. Repetitive description with respect to like elements of different embodiments may be omitted for the convenience of clarity.

FIG. 1 is a control block diagram of a display apparatus according to an exemplary embodiment of the present invention.

A display apparatus 1 according to an exemplary embodiment of the present invention includes a display unit 10 displaying an image, an image processing unit 20 processing an input image signal to be displayed in the display unit 10, and a control unit 30 controlling the image processing unit 20 to display the input image signal in the display unit 10.

The image processing unit 20 displays a mute image in the display unit 10 during a mute time A in changing an input image signal. That is, if a changing signal for changing an input image signal is input, the image processing unit 20 displays a mute image such as a black image in the display unit 10 during a predetermined mute time A. The image processing unit 20 may further include at least one of a scaler 25 scaling an input image signal, and an interlace to progressive conversion (IPC) unit 21 adjusting an image size of an input signal.

The mute image is a black screen set during a predetermined time during which images are converted to avoid a flicking phenomenon of a screen if a received broadcasting channel, etc. are changed. The mute time A means a time interval displaying the mute image in the display unit 10. For example, if a signal input to the display unit 10 is a digital signal, the mute time A is approximately 1.5 to 2 seconds. However, the mute time A is not limited thereto, and may be determined to be less than 1.5 second, such as 1 second, etc., or may exceed 2 seconds, such as 2.5 second, etc. Also, the mute time A may be approximately 1 second if an image signal input to the display unit 10 is an analog signal.

If a changing signal for changing an input image signal is input, the control unit 30 controls the image processing unit 20 to gradually convert an input image signal displayed on the total screen of the display unit 10 to the mute image before displaying the mute image.

Figure 4:
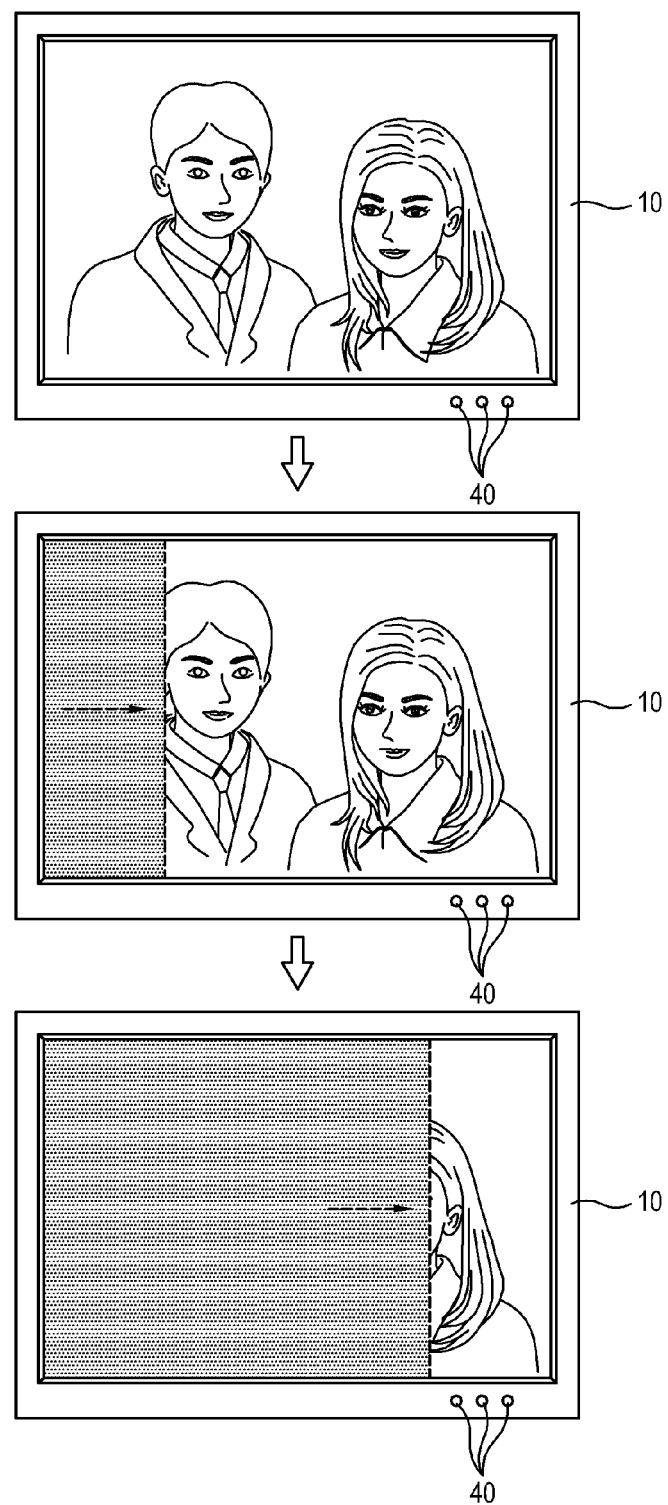
FIGS. 4 to 6 illustrate conversion types by a scaler in the display unit of the display apparatus according to the exemplary embodiment of the present invention.
Figure 5:
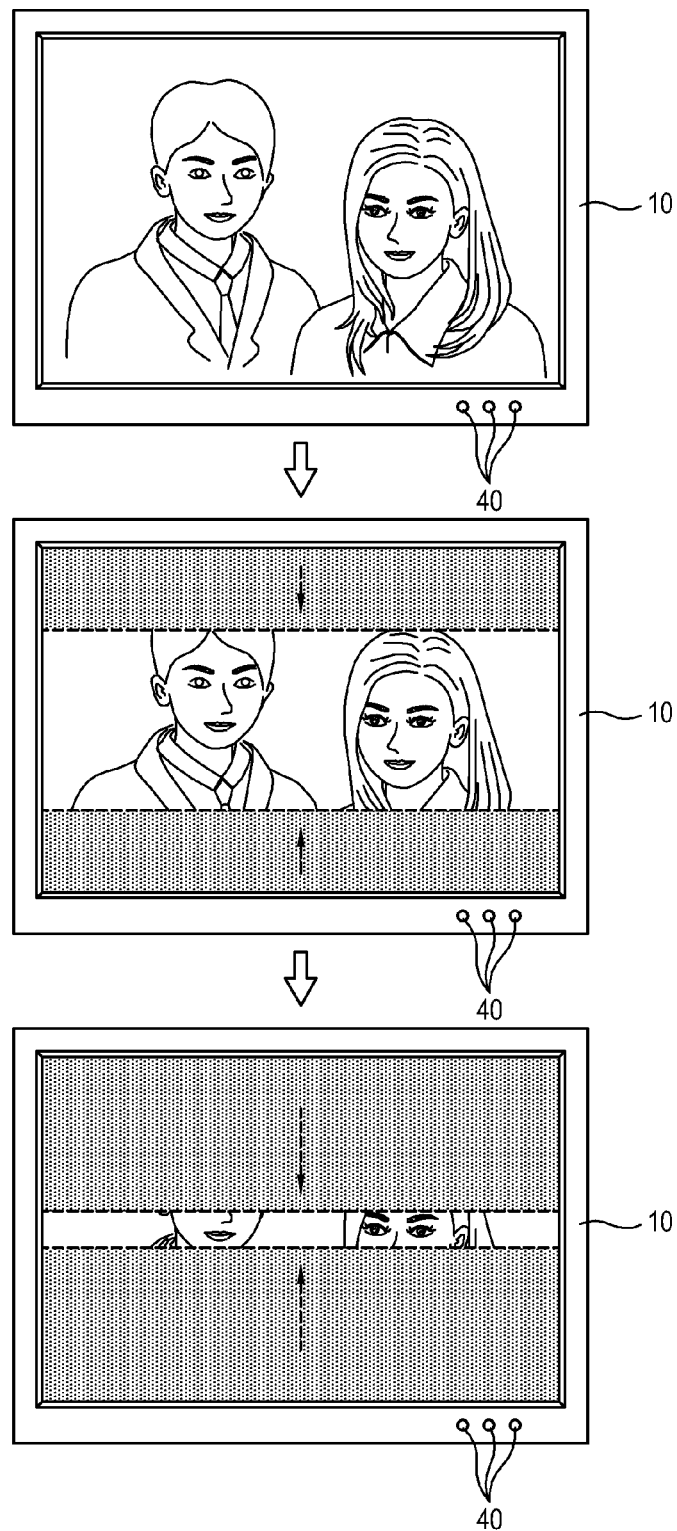
Figure 6:
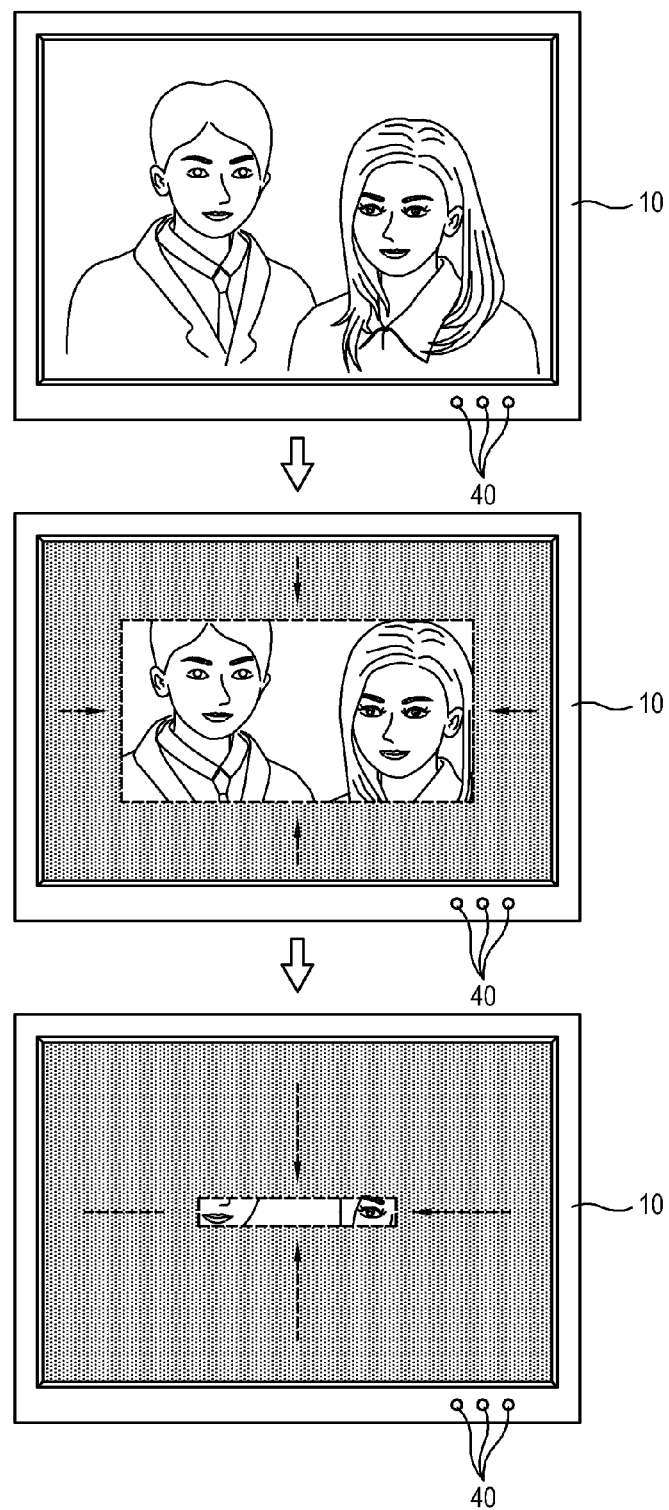
Figure 7:
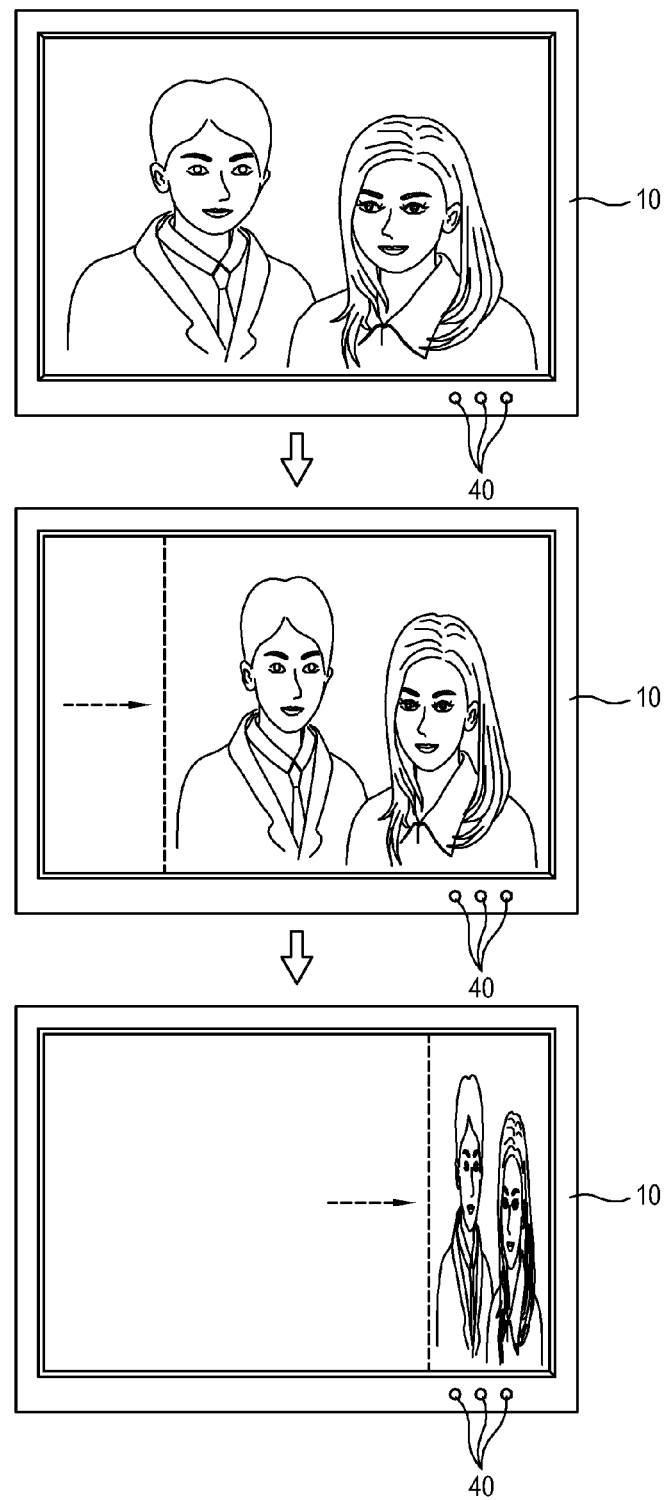
FIG. 7 illustrates conversion types by an IPC unit in the display unit of the display apparatus according to the exemplary embodiment of the present invention.

If a changing signal for changing an input image signal is input, the control unit 30 may control the scaler 25 to gradually convert the previously input image signal displayed on the total screen of the display unit 10 to the mute image before the mute image is displayed. That is, as shown in FIGS. 4 to 6, the control unit 30 may control the scaler 25 to scale an input image signal to reduce an image. If a changing signal for changing an input image signal is input, the control unit 30 may control the IPC unit 21 to gradually convert an image signal displayed on the total screen of the display unit 10 to the mute image before the mute image is displayed. That is, as shown in FIG. 7, the control unit 30 may control the IPC unit 21 to convert an input image signal to reduce the size of the total image.

After displaying the mute image in the display unit 10 during the mute time A, the control unit 30 may control the image processing unit 20 so that the mute image displayed in the total screen of the display unit 10 can be gradually converted to a recovery image of a changed image signal. In this case, the control unit 30 may control the scaler 25 to scale an input image signal to enlarge an image in the reverse order to the method illustrated in FIGS. 4 to 6. Also, the control unit 30 may control the IPC unit 21 to convert an input image signal to enlarge the size of the total image in the reverse order to the method illustrated in FIG. 7.

Figure 2:
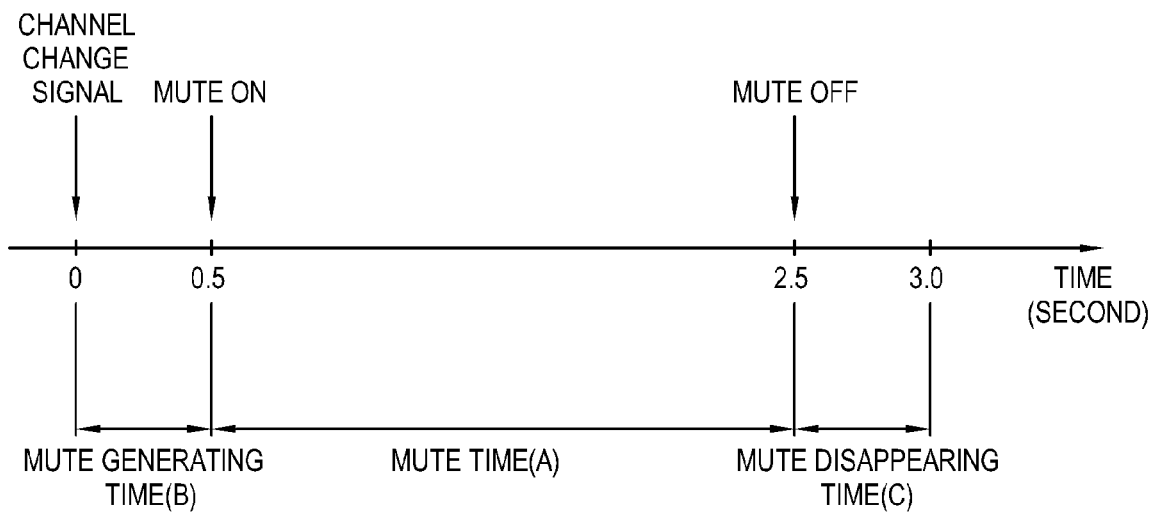
FIG. 2 illustrates a conversion process depending on time of a screen of a display unit of the display apparatus according to the exemplary embodiment of the present invention.

FIG. 2 illustrates a conversion process depending on time of a screen of the display unit 10 of the display apparatus according to the exemplary embodiment of the present invention. That is, for example, FIG. 2 illustrates a mute generating time B which is a time when gradual conversion of the total screen of the display unit 10 displaying a previously input image signal to a mute image takes place, if a channel change signal is input, a mute time A which is a time from a mute on point when the mute image is displayed to a mute off point, and a mute disappearing time C which is a time when gradual conversion of the mute image of the display unit 10 to a recovery image of an image signal changed by the channel change signal takes place.

The mute generating time B is from a time during which a channel change signal is input to the mute on point. That is, if a change signal for a channel change, etc., is input, the control unit 30 does not directly display the mute image, but delays displaying of the mute image during the mute generating time B.

The mute disappearing time C is a time from the mute off point to a time until the mute image completely disappears. That is, after the mute image is displayed during the mute time A, the control unit 30 does not directly display an image by a changed signal in the total screen of the display unit 10, but gradually displays the changed image during the mute disappearing time C.

As an example of the present invention, at least one of the mute generating time B and the mute disappearing time C is approximately 0.5 second to 1 second. However, at least one of the mute generating time B and the mute disappearing time C may be determined to be various times such as less than 0.5 second, or equal to or more than 1 second 0.05, such as 0.05 second, 0.1 second, 0.3 second, 1.2 second, 1.5 second, 2.0 second, etc. Also, the mute generating time B and the mute disappearing time C may be determined to be the same time, or one of the mute generating time B and the mute disappearing time C may be determined to shorter than the other thereof.

The display apparatus 1 according to the present exemplary embodiment may further include a user input unit 40 for determining a conversion type of a mute image in at least one of the mute generating time B and the mute disappearing time C. That is, the user input unit 40 may determine at least one of a mute generating type which gradually converts the total screen of the display unit 10 displaying an input image signal to a mute image, and a mute disappearing type which gradually converts the mute image of the display unit 10 to a recovery image of a changed image signal. Also, the control unit 30 may further control so that at least one of the mute generating type and the mute disappearing type can have a conversion type determined at the user input unit 40. As an example of the present invention, the user input unit 40 may be provided to the display unit 10 in a type of a plurality of buttons. That is, for example, the user input unit 40 may be provided three to a front lower area of the display unit 10 as shown in FIGS. 3 to 7. However, the user input unit 40 is not limited thereto, and may be provided in a button type of one, two or equal to or more than four, or may be provided in a remote controller type operating by wireless.

For example, the conversion type of a mute image determinable by the user input unit 40 may include at least one of a type of conversion from one side of the screen of the display unit 10 to the other side thereof, a type of conversion from the opposite sides of the screen of the display unit 10 to a central part and moving in the opposite direction thereto, and a type of conversion from four sides of the screen of the display unit 10 to a central part and moving in the opposite direction thereto. However, the conversion type of a mute image determinable by the user input unit 40 is not limited thereto, and various methods may be applied as long as the mute image can gradually appear and disappear in the screen.

Also, the display apparatus 1 according to the present exemplary embodiment may further include an on screen display (OSD) generating unit 50 generating a conversion type determining menu 55 in the display unit 10 to determine the conversion type of a mute image by the user input unit 40.

Figure 3:
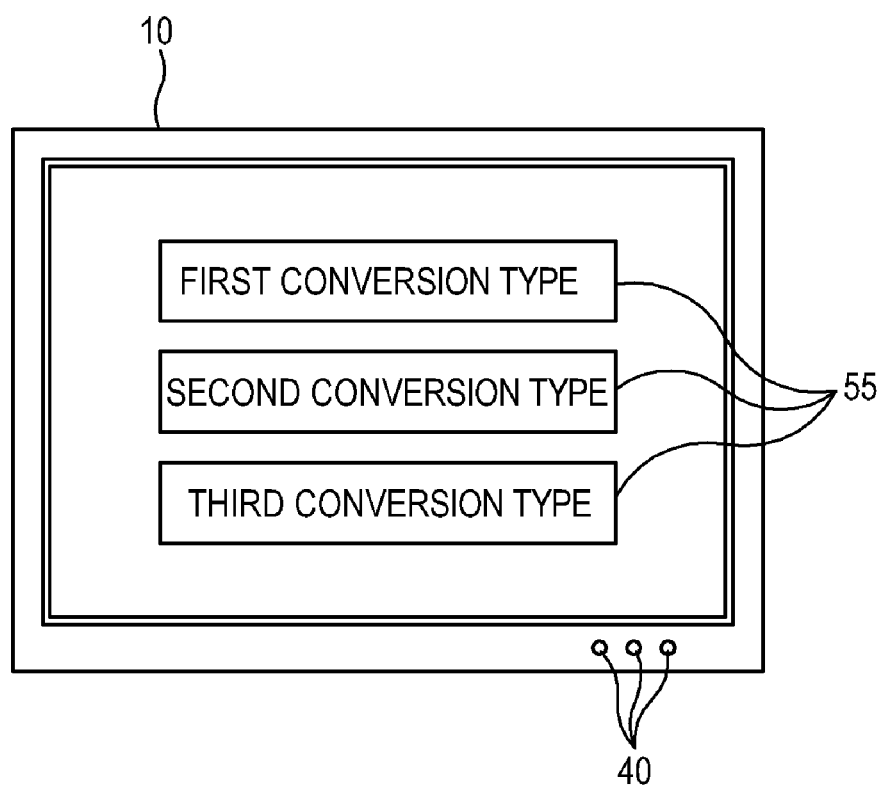
FIG. 3 illustrates a conversion type determining menu in the display unit of the display apparatus according to the present exemplary embodiment.

FIG. 3 illustrates a conversion type determining menu in the display unit 10 of the display apparatus 1 according to the present exemplary embodiment.

The conversion type determining menu 55 is displayed in the display unit 10 by the OSD generating unit 50 depending on an OSD generating signal generated by the user input unit 40. For example, the conversion type determining menu 55 is provided to include three conversion types, that is, a first conversion type, a second conversion type and a third conversion type. Accordingly, a user may select one of the plurality of conversion types displayed in the conversion type determining menu through the user input unit 40. However, the conversion type determining menu 55 is not limited thereto, and may include one, two or equal to or more than four conversion types.

FIGS. 4 to 6 illustrate conversion types by the scaler 25 in the display unit 10 of the display apparatus 1 according to the exemplary embodiment of the present invention. FIGS. 4 to 6 illustrate the first conversion type to the third conversion type. That is, as shown in FIG. 4, the first conversion type is a type of conversion from one side of the screen of the display unit 10 to the other side thereof. As shown in FIG. 5, the second conversion type is a type of conversion from the opposite sides of the screen of the display unit 10 to a central part thereof. As shown in FIG. 6, the third conversion type is a type of conversion from four sides of the screen of the display unit 10 to a central part thereof.

FIGS. 4 to 6 illustrate conversion types in which a mute image is gradually increased by the scaler 25 during the mute generating type B. Conversion types in which the mute image is gradually decreased by the scaler 25 during the mute disappearing type C may have the opposite directions to FIGS. 4 to 6.

FIG. 7 illustrates conversion types by the IPC unit 21 in the display unit 10 of the display apparatus according to the exemplary embodiment of the present invention. FIG. 7 representatively illustrates a first conversion type among the conversion types according to the present exemplary embodiment. As shown in FIG. 7, the first conversion type by the IPC unit 21 is a type of conversion from one side of the screen of the display unit 10 to the other side thereof. In comparison to FIG. 4 in which a part of the total image is gradually cut out, the total image gradually decreases in FIG. 7. FIG. 7 illustrates conversion types in which the mute image gradually increases during a mute generating time by the IPC unit 21, and conversion types in which the mute image gradually decreases during a mute disappearing time by the IPC unit 21 may have the opposite direction to FIG. 7.

Second and third conversion types by the IPC unit 21 may be configured based on the same methods as FIGS. 5 and 6.

The display apparatus 1 according to the present exemplary embodiment may further include a tuner 60 tuning an input broadcasting signal to output a transmission stream packet, a dimultiplexer 70 dimultiplexing the transmission stream packet input from the tuner 60 to output a basic stream packet, and a decoder 80 decoding the basic stream packet input from the dimultiplexer 70 to output to the image processing unit 20. Also, the display apparatus 1 may further include an external signal input unit 90 receiving an image signal from an outside to output to the image processing unit 20.

With this configuration, if a change signal changing an image signal is input for channel changing, before displaying the mute image, the display apparatus 1 according to the present exemplary embodiment can gradually convert the previously input image signal displayed on the total screen of the display unit 10 to a mute image, thereby preventing a user from being psychologically bored during a mute time, and from misunderstanding a trouble due to the mute image. Also, after displaying the mute image in the displaying unit 10 during a predetermined mute time, the display apparatus 1 can gradually convert the mute image displayed in the total screen of the display unit 10 to a recovery image of a changed image signal, thereby preventing a user from being psychologically bored during a mute time, and from misunderstanding a trouble due to the mute image.

Also, the display apparatus 1 according to the present exemplary embodiment is capable of gradually converting an image on the total screen of the display unit 10 at least one of before and after the mute time A without adding a component or changing a physical configuration, thereby reducing cost, and being applied to a previously manufactured product through an upgrading of a software.

Figure 8:
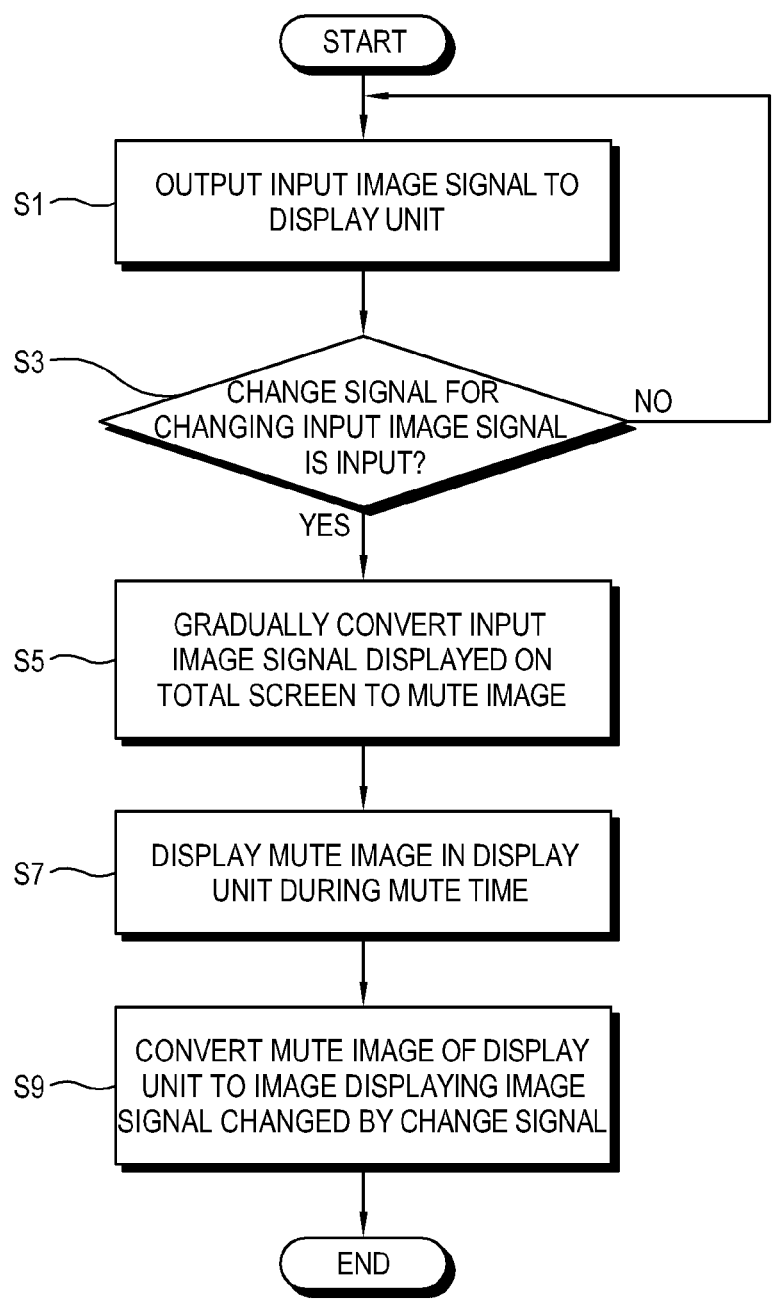
FIG. 8 is a control flowchart of the display apparatus according to the exemplary embodiment of the present invention.

FIG. 8 is a control flowchart of the display apparatus 1 according to the exemplary embodiment of the present invention. Hereinafter, a control method of the display apparatus according to the present exemplary embodiment will be described by referring thereto.

At first, an image signal input through the tuner 60 or an external signal input unit 90 is displayed in the display unit 10 through the image processing unit 20, etc. (S1). Then, the control unit 30 determines whether a changing signal changing an image signal previously input is input for a channel change or not (S3). If the change signal is not input, the image signal previously input is continuously displayed in the display unit 10. If the change signal is input, the control unit 30 does not directly display a mute image, but delays displaying of the mute image, and gradually converts the previously input image signal displayed on the total screen of the display unit 10 to the mute image during the mute generating time B (S5). Then, if the mute generating time B elapses, the control unit 30 displays the mute image in the display unit 10 during the mute time A (S7). Then, after displaying the mute image during the mute time A, the control unit 30 converts the mute image of the display unit 10 to display a recovery image of an image signal changed by the change signal (S9). Here, the control unit 30 does not directly display the image by the changed signal in the total screen of the display unit 10, but may gradually display the changed image during the mute disappearing time C.

The control method of the display apparatus according to the present exemplary embodiment may further include an operation of tuning an input broadcasting signal to output a transmission stream packet, an operation of dimultiplexing the output transmission stream packet to output a basic stream packet, and an operation of decoding the output basic stream packet.

With this configuration, the control method of the display apparatus 1 according to the present exemplary embodiment can prevent a user from being psychologically bored during the mute time, and from misunderstanding a trouble due to the mute image. Also, the control method of the display apparatus 1 according to the present exemplary embodiment can perform the conversion without adding a component or changing a physical configuration, thereby reducing cost, and being applied to a previously manufactured product through an upgrading of a software.

The display apparatus and the control method thereof according to the present exemplary embodiment are described to convert an image displayed in the display unit 10 during the mute generating time B and the mute disappearing time C which are before and after the mute time A, but may be configured to convert an image displayed in the display unit 10 during one of the mute generating time B and the mute disappearing time C. That is, the display apparatus and the control method thereof according to the present invention may be configured to convert an image displayed in the display unit 10 during only the mute generating time B before the mute time A, or may be configured to convert an image displayed in the display unit 10 during only the mute disappearing time C after the mute time A.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus, comprising:
a display unit which displays an image;
an image processing unit which processes an input image signal to be displayed in the display unit, and displays a mute image in the display unit during a mute time when changing the input image signal;
a control unit which controls the image processing unit to gradually convert the input image signal displayed on a total screen of the display unit to the mute image to shorten the displaying time of the mute image during a mute generating time before displaying the mute image and to gradually convert the mute image to a recovery image of a changed image signal during a mute disappearing time after displaying the mute image in the display unit if a change signal for changing the input image signal is input; and
a user input unit for determining at least one of a mute generating type, from among a plurality of selectable mute generating types, which gradually converts the input image signal displayed on the total screen of the display unit to the mute image, and a mute disappearing type, from among a plurality of selectable mute disappearing types, which gradually converts the mute of the display unit to the recovery image of the changed image signal.

2. The display apparatus according to claim 1, wherein at least one of the mute generating time during which the total screen of the display unit displaying the input image signal is gradually converted to the mute image, and a mute disappearing time during which the mute image of the display unit is gradually converted to the recovery image of the changed image signal, is approximately in a range from 0.5 second to 1 second.

3. The display apparatus according to claim 1,
wherein the control unit controls the user input unit to determine at least one of the mute generating type and the mute disappearing type as a conversion type.

4. The display apparatus according to claim 3, further comprising an on screen display (OSD) generating unit which generates a conversion type determining menu in the display unit so that the conversion type can be determined at the user input unit.

5. The display apparatus according to claim 3, wherein the conversion type determinable by the user input unit comprises at least one of a type conversion from one side of a screen of the display unit to the other side of the screen, a type of conversion from opposite sides of the screen of the display unit to a central part of the screen and moving in an opposite direction from the central part of the screen to the opposite sides of the screen, and a type of conversion from four sides of the screen of the display unit to the central part of the screen and moving in an opposite direction from the central part of the screen to the four sides of the screen of the display unit.

6. The display apparatus according to claim 1, wherein the image processing unit comprises a scaler which scales the input image signal, and
the control unit controls the scaler to gradually convert the input image signal displayed on the total screen of the display unit to the mute image before displaying the mute image if the change signal for changing the input image signal is input.

7. The display apparatus according to claim 1, wherein the image processing unit comprises an interlace to progressive conversion (IPC) unit which adjusts an aspect ratio of the input image signal, and
in response to a user selection of a first mute generating type, from among the plurality of mute generating types through the user input unit, the control unit controls the IPC unit to gradually convert, by gradually adjusting the aspect ratio of the input image signal, the input image signal displayed on the total screen of the display unit to the mute image before displaying the mute image if the change signal for changing the input image signal is input.

8. The display apparatus according to claim 1, further comprises:
a tuner which tunes an input broadcasting signal to output a transmission stream packet, a dimultiplexer which dimultiplexes the transmission stream packet input from the tuner to output a basic stream packet, and
a decoder which decodes the basic stream packet input from the dimultiplexer to output to the image processing unit.

9. The display apparatus according to claim 1, further comprising an external signal input unit which receives the input image signal from an outside to output to the image processing unit.

10. A control method of a display apparatus which includes a display unit displaying an image, the control method of the display apparatus comprising:
inputting a change signal for changing an input image signal;
gradually converting the input image signal displayed on a total screen of the display unit to a mute image;
determining by a user at least one of a mute generating type, from among a plurality of selectable mute generating types, which gradually converts the input image signal displayed on the total screen of the display unit to the mute image, and a mute disappearing type, from among a plurality of selectable mute disappearing types, which gradually converts the mute image of the display unit to the recovery image of the changed image signal;
displaying the mute image in the display unit during a mute time if the input image signal displayed on the total screen of the display unit is converted to the mute image; and
displaying a changed image signal in the display unit after the mute image is displayed during the mute time,
wherein, if the change signal is input, the mute image is delayed during a mute generating time, and
wherein if the change signal is input, the changed image is delayed during a mute disappearing time.

11. The control method of the display apparatus according to claim 10, further comprising determining at least one of the mute generating type and the mute disappearing type as a conversion type.

12. The control method of the display apparatus according to claim 11, further comprising generating a conversion type determining menu in the display unit so that the conversion type can be determined by an input of a user.

13. The control method of the display apparatus according to claim 11, wherein the conversion type determinable by an input of a user comprises at least one of a type conversion from one side of a screen of the display unit to another side of the screen, a type of conversion from opposite sides of the screen of the display unit to a central part of the screen and moving in an opposite direction from the central part of the screen to the opposite sides of the screen, and a type of conversion from four sides of the screen of the display unit to the central part of the screen and moving in an opposite direction from the central part of the screen to the four sides of the screen.

14. The control method of the display apparatus according to claim 10, further comprising:
tuning an input broadcasting signal to output a transmission stream packet,
dimultiplexing the output transmission stream packet to output a basic stream packet, and
decoding the output basic stream packet.

* * * * *